US011914067B2

(12) United States Patent
Alexanian et al.

(10) Patent No.: US 11,914,067 B2
(45) Date of Patent: Feb. 27, 2024

(54) PLATFORMED POST ARRAYS FOR WAVEGUIDES AND RELATED SENSOR ASSEMBLIES

(71) Applicant: VEONEER US, INC., Southfield, MI (US)

(72) Inventors: Angelos Alexanian, Lexington, MA (US); Arnold Mobius, North Chelmsford, MA (US)

(73) Assignee: Veoneer US, LLC, Southfield, MI (US)

( * ) Notice: Subject to any disclaimer, the term of this patent is extended or adjusted under 35 U.S.C. 154(b) by 281 days.

(21) Appl. No.: 17/244,593

(22) Filed: Apr. 29, 2021

(65) Prior Publication Data

US 2022/0349987 A1    Nov. 3, 2022

(51) Int. Cl.
G01S 7/02     (2006.01)
G01S 13/931   (2020.01)
H01Q 21/00    (2006.01)

(52) U.S. Cl.
CPC ............ *G01S 7/027* (2021.05); *G01S 13/931* (2013.01); *H01Q 21/0037* (2013.01)

(58) Field of Classification Search
CPC .................. G01S 7/027; G01S 13/931; H01Q 21/0037–21/0068; H01P 3/123
See application file for complete search history.

(56) References Cited

U.S. PATENT DOCUMENTS 4,517,571 A     5/1985 Mulliner et al.
5,416,492 A *   5/1995 Takahashi .......... H01Q 21/0068
                                              333/237
7,132,905 B2    11/2006 Sano
7,659,790 B2 *  2/2010 Shaul ..................... H01P 3/003
                                                333/1
8,779,995 B2    7/2014 Kirino et al.
(Continued)

FOREIGN PATENT DOCUMENTS

CN    102931492    2/2015
CN    106207357    12/2016
(Continued)

OTHER PUBLICATIONS

WO2018021244, Jan. 2, 2018, Denso Corporation, Machine Translation, (12 pgs).
(Continued)

*Primary Examiner* — Peter M Bythrow
(74) *Attorney, Agent, or Firm* — Matthew D. Thayne; Thayne and Davis LLC (57) ABSTRACT

Waveguides and related assemblies for use, for example, in RADAR sensor assemblies and the like. In some embodiments, the waveguide may comprise a conductive member having a first plurality of posts arranged in a first row thereon. A second plurality of posts may be arranged in a second row on the conductive member to define a waveguide between the first plurality of posts and the second plurality of posts. One or more platforms may be provided to project at least a subset of the first plurality of posts and the second plurality of posts beyond at least a portion of the conductive member adjacent to the one or more platforms. A second conductive member, such as a cover, may be coupled to the conductive member such that the first and second pluralities of posts extend between the conductive member and the cover.

19 Claims, 4 Drawing Sheets

(56) References Cited

U.S. PATENT DOCUMENTS

| | | | |
|---|---|---|---|
| 8,803,638 B2* | 8/2014 | Kildal | H01P 1/2005 333/248 |
| 9,153,851 B2 | 10/2015 | Nakamura | |
| 9,252,475 B2 | 2/2016 | Milyakh et al. | |
| 9,666,931 B2 | 5/2017 | Suzuki | |
| 9,786,995 B2* | 10/2017 | Kirino | H01Q 13/10 |
| 9,806,431 B1* | 10/2017 | Izadian | H01Q 21/005 |
| 10,020,591 B2* | 7/2018 | Uemichi | H01Q 13/22 |
| 10,164,344 B2 | 12/2018 | Kirino et al. | |
| 10,299,368 B2* | 5/2019 | Huang | H05K 1/0274 |
| 11,276,940 B2* | 3/2022 | Nakamoto | H01Q 13/18 |
| 11,611,138 B2* | 3/2023 | Ogawa | H01P 11/002 |
| 2004/0124956 A1* | 7/2004 | Ahn | H01P 11/003 333/238 |
| 2005/0128028 A1* | 6/2005 | Sanchez | H01Q 21/005 333/208 |
| 2009/0066597 A1* | 3/2009 | Yang | H01Q 21/005 343/771 |
| 2011/0050356 A1 | 3/2011 | Nakamura et al. | |
| 2011/0187614 A1* | 8/2011 | Kirino | G01S 7/032 333/239 |
| 2014/0111392 A1 | 4/2014 | Ou | |
| 2015/0222021 A1 | 6/2015 | Stevenson et al. | |
| 2015/0222023 A1 | 8/2015 | Shijo et al. | |
| 2015/0236414 A1* | 8/2015 | Rosen | H01Q 15/24 343/756 |
| 2015/0318618 A1* | 11/2015 | Chen | H01P 7/082 343/750 |
| 2016/0254582 A1 | 9/2016 | Jensen | |
| 2017/0040703 A1 | 2/2017 | Cheng et al. | |
| 2017/0084971 A1* | 3/2017 | Kildal | H01P 1/207 |
| 2017/0086288 A1* | 3/2017 | Ouyang | H01P 3/04 |
| 2017/0187121 A1* | 6/2017 | Kirino | H01Q 21/005 |
| 2017/0187124 A1 | 6/2017 | Kirino et al. | |
| 2017/0229752 A1* | 8/2017 | Kirino | H01Q 1/50 |
| 2017/0237177 A1 | 8/2017 | Kirino et al. | |
| 2017/0288313 A1* | 10/2017 | Chung | H01Q 1/50 |
| 2017/0343667 A1* | 11/2017 | Vacanti | G01S 13/933 |
| 2018/0013208 A1 | 1/2018 | Izadian et al. | |
| 2018/0212324 A1* | 7/2018 | Tatomir | H01Q 21/064 |
| 2018/0301816 A1 | 10/2018 | Kamo et al. | |
| 2018/0301819 A1* | 10/2018 | Kirino | G01S 1/00 |
| 2018/0351261 A1 | 12/2018 | Kamo et al. | |
| 2019/0058260 A1* | 2/2019 | Kirino | H01Q 21/064 |
| 2019/0074569 A1* | 3/2019 | Kamo | H01P 5/222 |
| 2019/0089042 A1* | 3/2019 | Purden | H01Q 13/06 |
| 2019/0109361 A1* | 4/2019 | Ichinose | H01P 3/123 |
| 2019/0139914 A1* | 5/2019 | Kirino | H01P 3/123 |
| 2019/0296443 A1* | 9/2019 | Kirino | H01P 3/123 |
| 2020/0112077 A1* | 4/2020 | Kamo | G01S 7/032 |
| 2020/0119423 A1* | 4/2020 | Kamo | H01Q 5/55 |
| 2020/0194900 A1* | 6/2020 | Doyle | G01S 13/931 |
| 2020/0227807 A1 | 7/2020 | Hideki | |
| 2020/0287291 A1* | 9/2020 | Yang | H01Q 1/523 |
| 2020/0313287 A1* | 10/2020 | Kona | H01Q 21/08 |
| 2021/0135370 A1* | 5/2021 | Hamminga | H01Q 21/005 |
| 2021/0349206 A1* | 11/2021 | Kim | H01Q 13/106 |
| 2023/0146641 A1* | 5/2023 | Kim | H01Q 21/0075 342/27 |

FOREIGN PATENT DOCUMENTS

| | | |
|---|---|---|
| EP | 2343774 | 7/2011 |
| EP | 2677594 | 12/2013 |
| EP | 2862227 | 4/2015 |
| EP | 2945222 | 11/2015 |
| EP | 3147994 | 3/2017 |
| IN | 201717024455 | 10/2017 |
| WO | 2010003808 | 1/2010 |
| WO | 2013185807 | 12/2013 |
| WO | 2013189919 | 12/2013 |
| WO | 2014090290 | 6/2014 |
| WO | 2015172948 | 11/2015 |
| WO | 201658627 | 4/2016 |
| WO | 2016058627 | 4/2016 |
| WO | 2016116126 | 7/2016 |
| WO | 2017078183 | 5/2017 |
| WO | 2018021244 | 1/2018 |
| WO | 201867046 | 4/2018 |

OTHER PUBLICATIONS

CN102931492, Feb. 11, 2015, Beijing Institute of Telemetry Technology, Machine Translation (9 pages).

CN106207357, Dec. 7, 2017, Chengdu Xanaway Technology Co., Ltd., Machine Translation (58 pages).

PCT/US2022/026839, Preliminary Report, Written Opinion (13 pgs).

Sanchez-Escuderos Daniel et al.: "True-Time-Delay Mechanical Phase Shifter in Gap Waveguide Technology for Slotted Waveguide Arrays in Ka-Band", (15 pgs).

* cited by examiner

PLATFORMED POST ARRAYS FOR WAVEGUIDES AND RELATED SENSOR ASSEMBLIES

SUMMARY

Waveguide antennas are often used in automotive sensors, such as RADAR sensors. For ease of manufacturing, these waveguides are typically built in two segments, one segment consisting of a metal ground plane with periodic posts forming the separation walls and a flat cover. Also for ease of manufacturing, the posts are typically made using a die casting process. This process implicates functional restrictions on the aspect ratio of the posts, which is the ratio of the post length to cross section, as well as the gap between the posts. From a manufacturing point of view, it is often desirable to reduce the height of the posts in relation to their cross section. However, this preference may be limited or contradicted by electrodynamic considerations.

The present inventors have therefore determined that it would be desirable to provide apparatus, systems, and methods that overcome one or more of the foregoing limitations and/or other limitations of the prior art. In some embodiments, the inventive concepts disclosed herein may therefore, some embodiments, provide a novel blend of posts combined with other elements or features to result in a functionally equivalent waveguide while allowing for manufacturing of shorter posts. In some embodiments, this benefit may be provided by using one or more platforms to boost the effective height of the posts while allowing the posts themselves to be shorter. Some embodiments may also, or alternatively, provide for one or more trenches in between adjacent rows of posts and/or positioning of material in between posts in the same row, which may accomplish a similar result.

In a more particular example of a waveguide, such as a RADAR waveguide for use in a vehicle sensor assembly, according to some embodiments, the waveguide may comprise a conductive member having a first plurality of posts arranged in a first row on the conductive member. A second plurality of posts may be arranged in a second row on the conductive member so as to define a waveguide between the first plurality of posts and the second plurality of posts. The waveguide may further comprise one or more platforms that may be configured to project at least a subset of the first plurality of posts and the second plurality of posts beyond at least a portion of the conductive member adjacent to the one or more platforms. A cover may be coupled to the conductive member such that the first and second pluralities of posts extend between the conductive member and the cover.

In some embodiments, the one or more platforms may comprise a first platform extending along the first row to project the first plurality of posts above a floor of the conductive member and a second platform extending along the second row to project the second plurality of posts above the floor of the conductive member.

Some embodiments may further comprise a third plurality of posts arranged in a third row positioned adjacent to the first row on a first side of the waveguide; and a fourth plurality of posts arranged in a fourth row positioned adjacent to the second row on a second side of the waveguide opposite the first side.

Some embodiments may comprise additional platforms, such as a third platform extending along the third row to project the third plurality of posts above the floor of the conductive member; and a fourth platform extending along the fourth row to project the fourth plurality of posts above the floor of the conductive member.

In some embodiments, the waveguide may comprise a waveguide floor extending along the conductive member, wherein a trench is formed between the first and third rows and between the second and fourth rows such that a distance between the waveguide floor and the cover is less than a distance from a bottom of each trench and the cover.

In some embodiments, a distance between the waveguide floor and the cover may be at least substantially equal to a distance between a lowermost point between adjacent rows of posts on the same side of the waveguide and the cover. Alternatively, the distance between the waveguide floor and the cover may be less than the distance from in between adjacent rows of posts on each side of the waveguide, which may be, for example, by virtue of the formation of the aforementioned trench(es).

In some embodiments, a height of each of the posts measured between adjacent posts in the same row may be less than a height of each of the posts measured between adjacent posts in adjacent rows on the same side of the waveguide. This height between adjacent posts in the same row may be the same, or greater than, the height between the waveguide floor and the top of the posts and/or the cover.

In another specific example of a waveguide according to some embodiments, the waveguide may comprise a first conductive member having a first row of posts extending therefrom, and a second row of posts extending from the first conductive member opposite the first row to define a waveguide therebetween. A platform system may be provided and may be configured to project each of the posts above a floor of the waveguide defined by the first conductive member. The platform system may comprise a single platform that projects all of the posts up, or there may be multiple platforms each of which may project a single post or row of posts.

Some embodiments may comprise multiple rows of posts on each side of the waveguide to further confine the electromagnetic radiation. For example, some embodiments may comprise a third row of posts extending from the first conductive member adjacent to the first row of posts to, collectively with the first row of posts, define a first waveguide wall on a first side of the waveguide; and a fourth row of posts extending from the first conductive member adjacent to the second row of posts to, collectively with the second row of posts, define a second waveguide wall on a second side of the waveguide opposite the first side, wherein the waveguide is formed between the first waveguide wall and the second waveguide wall.

Some such embodiments may further comprise one or more trenches formed between adjacent rows of posts on each side of the waveguide(s). Thus, for example, some embodiments may comprise a first trench formed between the first row of posts and the third row of posts; and a second trench formed between the second row of posts and the fourth row of posts. In some such embodiments, the first and second trenches may be formed such that a height of at least a subset of the posts measured from the floor of the waveguide is at least substantially equal to a height of the at least a subset of the posts measured from within the first and second trenches.

Some embodiments may further comprise a second conductive member coupled to the first conductive member to define a lid for the waveguide.

In still another specific example of a waveguide according to some embodiments, the waveguide may comprise a conductive member and a first pair of rows of posts coupled with the conductive member and extending towards the cover. The waveguide may further comprise a second pair of rows of posts coupled with the conductive member to define a waveguide between the first pair of rows of posts and the second pair of rows of posts. A waveguide floor may extend between the first pair of rows of posts and the second pair of rows of posts. In some embodiments, a height of at least a subset of the posts measured from the waveguide floor is less than a height of the at least a subset of the posts measured from between adjacent posts in different rows on the same side of the waveguide.

In some embodiments, a first trench may be formed between the first pair of rows of posts, and a second trench may be formed between the second pair of rows of posts.

Some embodiments may further comprise a cover coupled to the conductive member, such as a plate, which may, together with a plate forming the conductive member, define a parallel plate waveguide.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
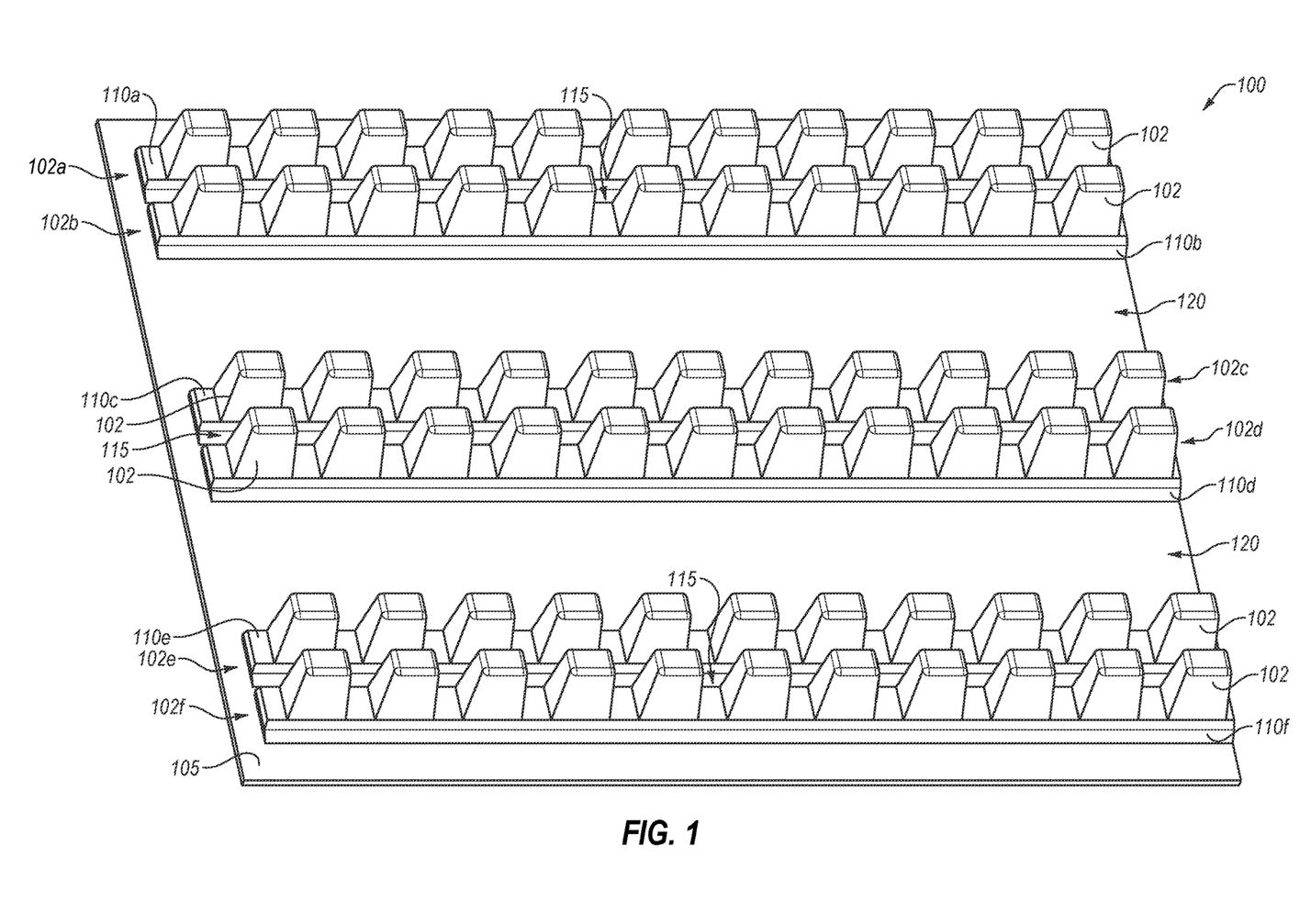
FIG. 1 is a perspective view of a waveguide assembly according to some embodiments.

FIG. 1 depicts a waveguide assembly 100 comprising waveguides 120 defined by opposing rows of posts 102. Waveguide assembly 100 may be used, for example, in RADAR sensor assemblies for vehicles. However, it is contemplated that waveguide assembly 100, or principles otherwise disclosed herein, may be used in various other applications and/or industries, as those of ordinary skill in the art will appreciate.

Assembly 100 comprises waveguides 120 that are defined by two rows of posts 102 on either side. Thus, a first waveguide 120 is defined by two adjacent rows 102a and 102b of posts 102 on one side and two adjacent rows 102c and 102d of posts 102 on the opposite side. A second waveguide 120 is formed by the aforementioned rows 102c and 102d of posts 102 on one side, and rows 102e and 102f of posts 102 on the other side.

This allows for electromagnetic energy to resonate in the space between the opposing rows of posts 102, which extend from a ground plane of a conductive member 105. Although not shown in FIG. 1, those of ordinary skill in the art will further appreciate that assembly 100 will typically further comprise a second plane or cover, which, as discussed below, will serve to further confine the electromagnetic energy and form a parallel plate waveguide in between the opposing planes/plates and the opposing rows of posts 102.

In typical automotive applications, efficiency is greatest if the length of the posts 102 are about a quarter of the wavelength of the electromagnetic radiation in height. However, the present inventor has discovered that the posts 102 may be made to have an "effective height" similar, if not identical, to the ideal post height by adding and/or removing material in particular locations, such as by adding a support structure below and/or between the posts along one or more rows of the posts and/or forming trenches in the space between adjacent rows of posts. This results in an ability to form shorter posts without sacrificing efficiency/performance, which may decrease costs and/or improve manufacturing efficiency.

In the depicted embodiment, a platform is provided for each row of posts 102 to boost posts 102 above the floor of conductive member/plate 105. Thus, each post 102 in row 102a extends from platform 110a. Similarly, each post 102 in row 102b extends from platform 110b, each post 102 in row 102c extends from platform 110c, each post 102 in row 102d extends from platform 110d, each post 102 in row 102e extends from platform 110e, and each post 102 in row 102f extends from platform 110f.

In addition, a trench 115 is formed between each pair of adjacent rows of posts 102 on either side of each waveguide 120. In the depicted embodiment, these trenches 115 are formed by virtue of a space being left between each pair of adjacent platforms 110. However, a variety of alternative configurations are contemplated. For example, in some embodiments, trenches may be formed by removing material from in between adjacent rows of posts. It is also contemplated that, in alternative embodiments, waveguide 120 may be defined by a single row of posts 102 on either side, rather than two opposing rows of posts as shown in the figures.

In addition, although the embodiment of FIG. 1 is shown with platforms 110 extending along each entire row of posts 102, in alternative embodiments, individual platforms may be formed for each post 102 if desired. However, it is contemplated that, in such embodiments, it may be preferred that the bottom level of the space between each adjacent row of posts 102 be below the bottom level of the space between each adjacent post 102 in the same row. As explained in greater detail below, it is therefore contemplated that the height between the floor of the waveguides 120 and the cover or top conductive member should be, in preferred embodiments, either equal to or less than the height between the bottom level between adjacent rows of posts 102 and the cover or top conductive member.

Figure 2:
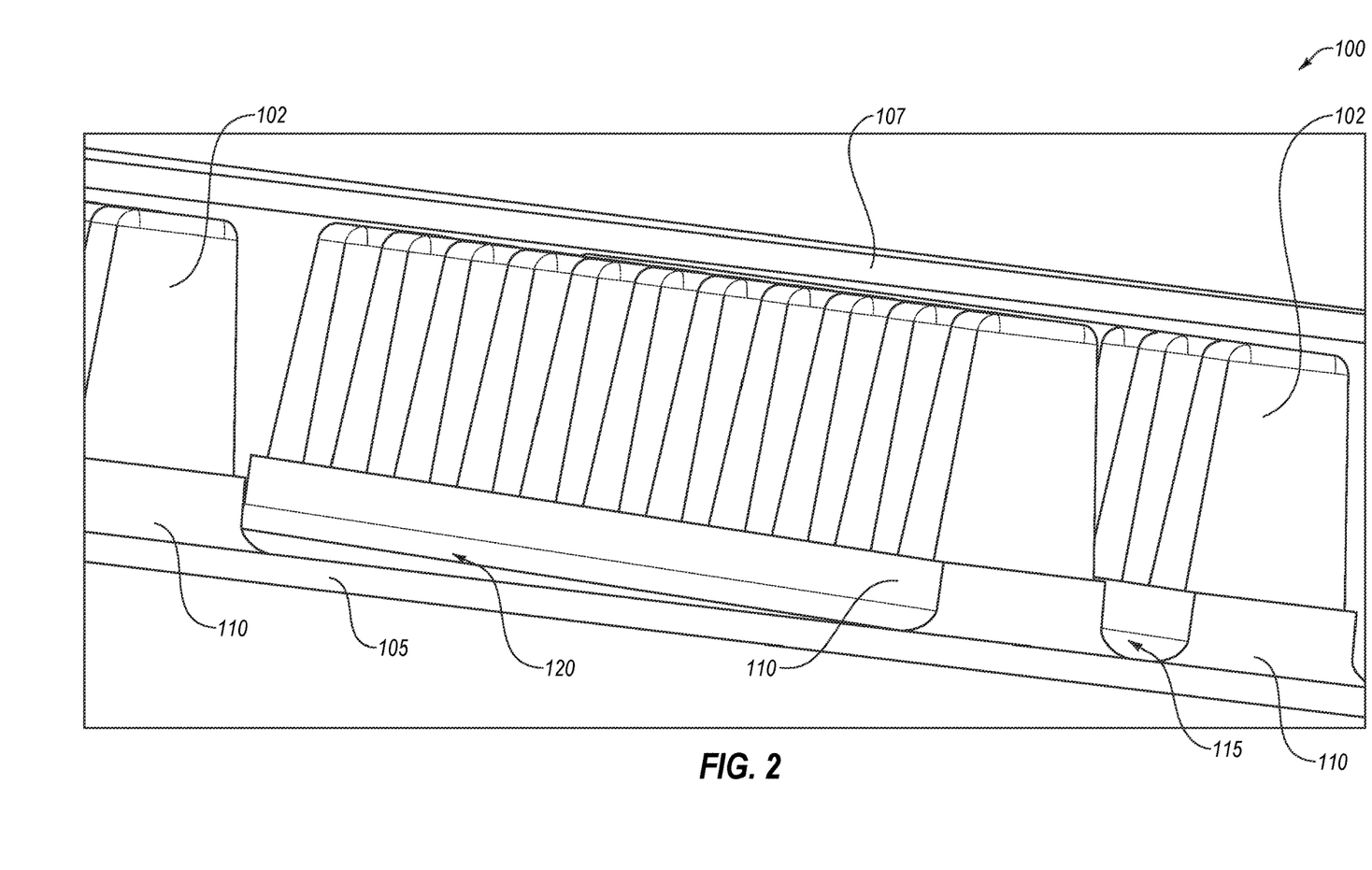
FIG. 2 better depicts the platforms to allow the height of the posts to be reduced without impacting performance and the trenches between adjacent posts on one side of one of the waveguides of the embodiment of FIG. 1.

FIG. 2 better illustrates the various platforms 110 used to boost the height of the posts 102, along with one of the trenches 115 formed in between adjacent platforms 110 and rows of posts 102. FIG. 2 further illustrates the presence of a top cover or conductive member 107 used to form the upper plane or lid for the waveguide(s) 120 thereunder.

Figure 3:
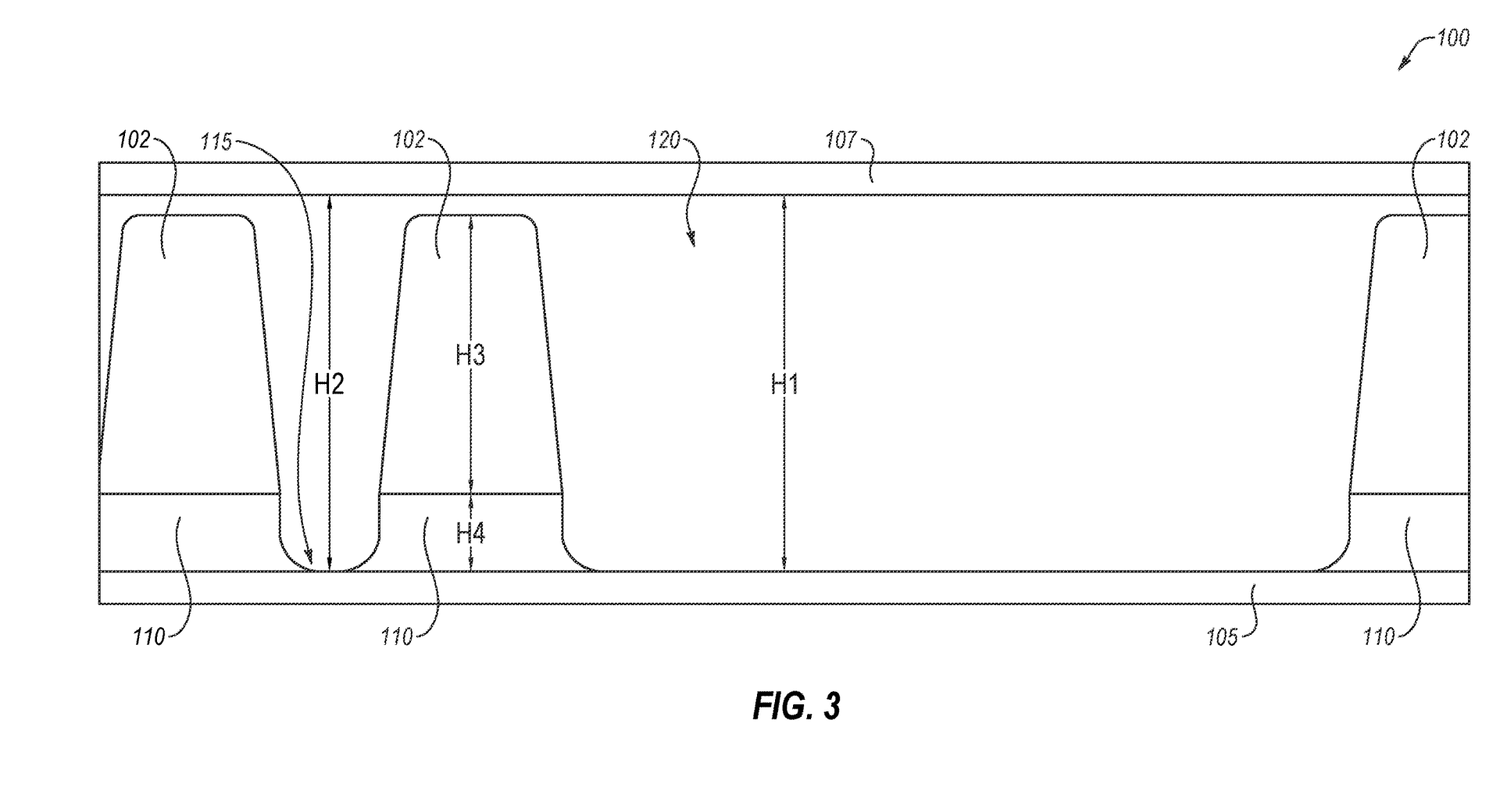
FIG. 3 is a front side elevation view of the waveguide assembly of FIGS. 1 and 2 illustrating various distance parameters that may be adjusted in various embodiments.

FIG. 3 is a front side elevation view of waveguide assembly 100 illustrating various distances/parameters that may be changed as desired in various embodiments. Distance H1 is the height between the floor and ceiling/lid of waveguide 120 defined by conductive members 105 and 107, respectively. Distance H2 is the distance between the lowermost point of trench 115 between adjacent posts 102 and cover/conductive member 107. Distance H3 is the height of the posts 102. And distance H4 is the height of the platform(s) 110.

Distance H2 is preferably about ¼ of the wavelength of the radiation being confined by waveguide(s) 120. Distance H1 can be the same, or at least substantially the same, as distance H2, as suggested by the dimensions in FIG. 3. However, this need not be the case in all embodiments. Indeed, as shown and discussed below in connection with FIG. 4, distance H1 may be less than distance H2 in some embodiments. Preferably, the combined height of H3 and H4 is equal, or at least substantially equal, to ¼ of the wavelength of the radiation being confined by waveguide(s) 120.

For use in automotive RADAR applications, such as 77 GHz RADAR, posts 102 having a height of about 1.03 mm may be replaced with platforms having a height of about 0.25 mm with posts having a height of about 0.86 mm stacked thereon. Thus, the combined height of the posts and platform may be substantially but not precisely equal to the effective height of posts alone absent the platform. Otherwise stated, it is contemplated that, although replacing longer posts with shorter posts and a platform will allow for use of shorter posts, it may not lead to a precisely unchanged overall height. As those of ordinary skill will appreciate, optimum numbers may be identified by modeling and/or other manufacturing and performance considerations.

In preferred embodiments, the exemplary heights for the posts and/or platforms cited above may vary by about +/−20% in either direction. In some such embodiments, the exemplary heights for the posts and/or platforms cited above may vary by about +/−10% in either direction. The platform(s) 110 may therefore, for example, have a height of between about 0.2 and about 0.3 mm and the posts 102 may have a height of between about 0.7 mm and about 1 mm. Similarly, in preferred embodiments, distance H2 may be between about 0.8 mm and about 1.25 mm. More preferably, the platform(s) 110 may have a height of between about 0.22 and about 0.28 mm and the posts 102 may have a height of between about 0.75 mm and about 0.95 mm and distance H2 may be between about 0.9 mm and about 1.15 mm.

Figure 4:
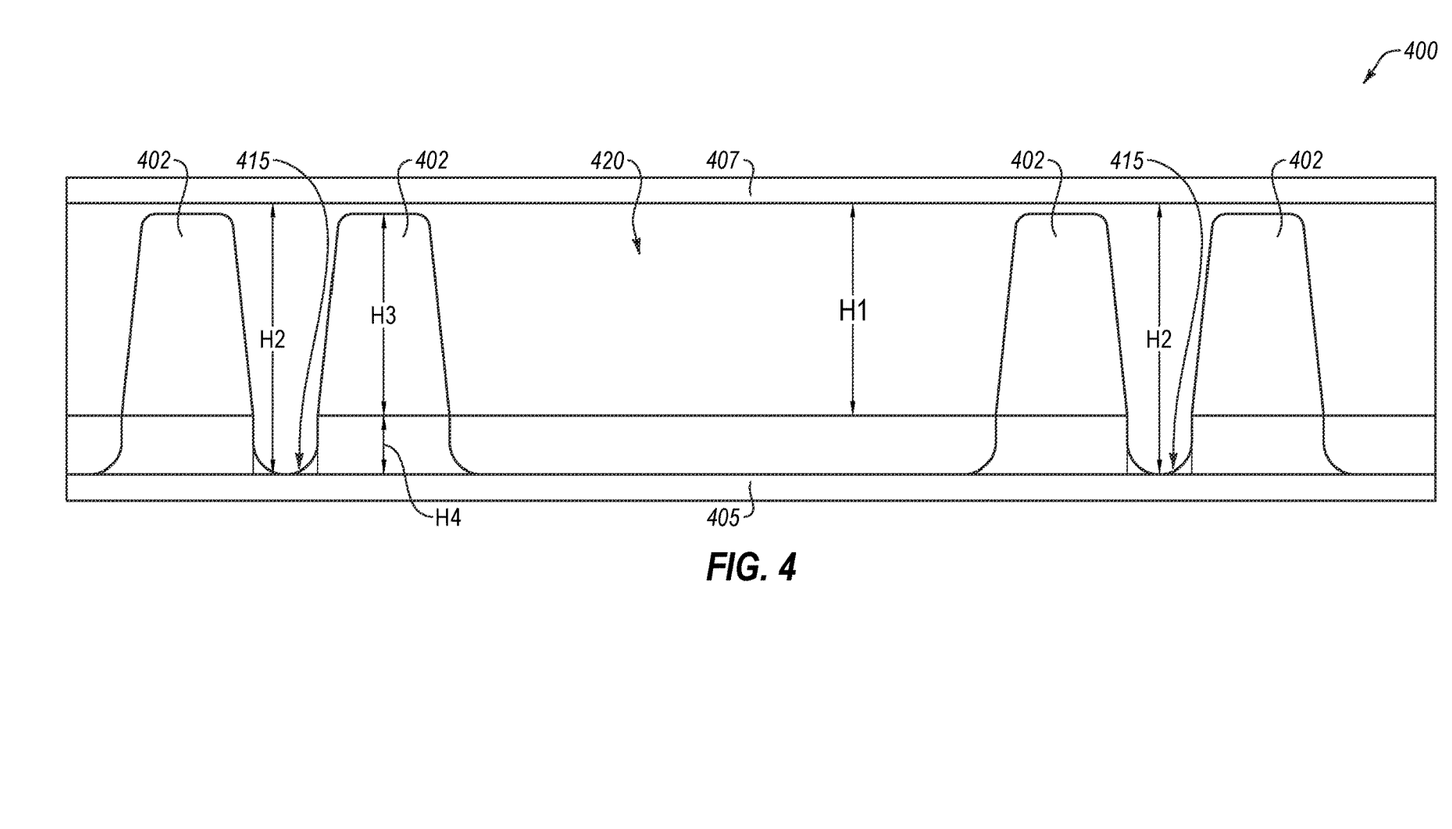
FIG. 4 is a front side elevation view of a waveguide assembly according to other embodiments.

FIG. 4 is a side elevation view of a waveguide assembly 400 according to other embodiments. Similar to waveguide assembly 100, waveguide assembly 400 defines a parallel plate waveguide between conductive elements 405 and 407 in one direction, and between opposing pairs of rows of posts 402 in another direction. FIG. 4 further illustrates various distances/parameters that may be changed as desired in various embodiments. Again, distance H1 is the height between the floor and ceiling/lid of waveguide 420 defined by conductive members 405 and 407, respectively.

However, in this embodiment, distance H1 is measured from the base of the posts 402 and distance H2 is the distance between the lowermost point of trench 415 between adjacent posts 402 and cover/conductive member 407. It can also be seen that distance H2 is greater than distance H1. This can be thought of in two ways. First, this as providing a platform for posts 402 that extends all the way between the opposing rows of posts 402 to also define the floor of the waveguide 420 with trenches 415 being gaps between adjacent platforms. Alternatively, this configuration may be thought of and/or constructed as providing a thicker bottom conductive member 405 and then etching or otherwise removing material from in between adjacent posts 402 on the same side of waveguide 420 to define trenches 415.

Distance H3 is the height of the posts 402, as measured from the floor of the waveguide 420. Distance H4 can be considered the height of the platform(s), if assembly 400 is manufactured using a platform added to conductive member 405. Alternatively, distance H4 can be considered the depth of the trench 415 if a thicker conductive member is used during manufacturing as the platform rather than applying one or more platforms to the conductive member/plane 405, as mentioned above.

As those of ordinary skill in the art will appreciate, whereas preferred embodiments of the inventions disclosed herein may be used in connection with vehicle sensors, such as vehicle RADAR modules or the like, the principles disclosed herein may be used in a wide variety of other contexts, such as other types of RADAR assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A waveguide, comprising:
   a conductive member;
   a first plurality of posts arranged in a first row on the conductive member;
   a second plurality of posts arranged in a second row on the conductive member so as to define a waveguide between the first plurality of posts and the second plurality of posts;
   one or more platforms configured to project at least a subset of the first plurality of posts and the second plurality of posts beyond at least a portion of the conductive member adjacent to the one or more platforms, wherein at least one of the one or more platforms projects a plurality of posts beyond the at least a portion of the conductive member; and
   a cover coupled to the conductive member such that the first and second pluralities of posts extend between the conductive member and the cover.

2. The waveguide of claim 1, wherein the one or more platforms comprise:
   a first platform extending along the first row to project the first plurality of posts above a floor of the conductive member; and
   a second platform extending along the second row to project the second plurality of posts above the floor of the conductive member.

3. The waveguide of claim 2, further comprising:
   a third plurality of posts arranged in a third row positioned adjacent to the first row on a first side of the waveguide; and
   a fourth plurality of posts arranged in a fourth row positioned adjacent to the second row on a second side of the waveguide opposite the first side.

4. The waveguide of claim 3, further comprising:
   a third platform extending along the third row to project the third plurality of posts above the floor of the conductive member; and
   a fourth platform extending along the fourth row to project the fourth plurality of posts above the floor of the conductive member.

5. The waveguide of claim 4, wherein the waveguide comprises a waveguide floor extending along the conductive member, and wherein a trench is formed between the first and third rows and between the second and fourth rows such that a distance between the waveguide floor and the cover is less than a distance from a bottom of each trench and the cover.

6. The waveguide of claim 3, wherein a distance between the waveguide floor and the cover is at least substantially equal to a distance between a lowermost point between adjacent rows of posts on the same side of the waveguide and the cover.

7. The waveguide of claim 3, wherein a height of each of the posts measured between adjacent posts in the same row is less than a height of each of the posts measured between adjacent posts in adjacent rows on the same side of the waveguide.

8. The waveguide of claim 1, wherein the waveguide comprises a RADAR waveguide for use in a vehicle sensor assembly.

9. A waveguide, comprising:
   a first conductive member;
   a first row of posts extending from the first conductive member;
   a second row of posts extending from the first conductive member opposite the first row to define a waveguide therebetween; and
   a platform system configured to project each of the posts above a floor of the waveguide defined by the first conductive member, wherein the platform system comprises a first platform for the first row of posts and a second platform for the second row of posts.

10. The waveguide of claim 9, further comprising:
    a third row of posts extending from the first conductive member adjacent to the first row of posts to, collectively with the first row of posts, define a first waveguide wall on a first side of the waveguide; and
    a fourth row of posts extending from the first conductive member adjacent to the second row of posts to, collectively with the second row of posts, define a second waveguide wall on a second side of the waveguide opposite the first side, wherein the waveguide is formed between the first waveguide wall and the second waveguide wall.

11. The waveguide of claim 10, wherein the platform system comprises a separate platform for each of the rows of posts.

12. The waveguide of claim 10, further comprising:
    a first trench formed between the first row of posts and the third row of posts; and
    a second trench formed between the second row of posts and the fourth row of posts.

13. The waveguide of claim 12, wherein the first and second trenches are formed such that a height of at least a subset of the posts measured from the floor of the waveguide is at least substantially equal to a height of the at least a subset of the posts measured from within the first and second trenches.

14. The waveguide of claim 9, further comprising a second conductive member coupled to the first conductive member to define a lid for the waveguide.

15. A waveguide, comprising:
a conductive member;
a first pair of rows of posts coupled with the conductive member;
a second pair of rows of posts coupled with the conductive member to define a waveguide between the first pair of rows of posts and the second pair of rows of posts; and
a waveguide floor extending between the first pair of rows of posts and the second pair of rows of posts, wherein a height of at least a subset of the posts measured from the waveguide floor is less than a height of the at least a subset of the posts measured from between adjacent posts in different rows on the same side of the waveguide.

16. The waveguide of claim 15, wherein a first trench is formed between the first pair of rows of posts, and wherein a second trench is formed between the second pair of rows of posts.

17. The waveguide of claim 15, further comprising a cover coupled to the conductive member, wherein the first pair of rows of posts and the second pair of rows of posts extend towards the cover.

18. The waveguide of claim 17, wherein the conductive member comprises a first plate, and wherein the cover comprises a second plate to define a parallel plate waveguide with the first plate.

19. The waveguide of claim 1, wherein each of the one or more platforms projects a plurality of posts beyond the at least a portion of the conductive member.

\* \* \* \* \*